United States Patent
Jin et al.

(10) Patent No.: US 6,643,782 B1
(45) Date of Patent: *Nov. 4, 2003

(54) METHOD FOR PROVIDING SINGLE STEP LOG-ON ACCESS TO A DIFFERENTIATED COMPUTER NETWORK

(75) Inventors: Jane Jiaying Jin, San Jose, CA (US); Jie Chu, Los Altos, CA (US); Maria Alice Dos Santos, Redwood City, CA (US); Shuxian Lou, San Jose, CA (US); Xi Xu, Milpitas, CA (US); Shujin Zhang, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/882,256

(22) Filed: Jun. 14, 2001

Related U.S. Application Data

(63) Continuation of application No. 09/128,990, filed on Aug. 3, 1998, now Pat. No. 6,311,275.

(51) Int. Cl.[7] .................................................. G06F 9/32
(52) U.S. Cl. ....................................................... 713/201
(58) Field of Search ................................. 713/200, 201, 713/202; 709/223, 224, 225, 227, 228, 238

(56) References Cited

U.S. PATENT DOCUMENTS

| | | | |
|---|---|---|---|
| 5,003,595 A | 3/1991 | Collins et al. | 380/25 |
| 5,241,594 A | 8/1993 | Kung | 380/4 |
| 5,241,599 A | 8/1993 | Bellovin et al. | 380/21 |
| 5,351,136 A | 9/1994 | Wu et al. | 358/440 |
| 5,416,842 A | 5/1995 | Aziz | 380/30 |
| 5,440,635 A | 8/1995 | Bellovin et al. | 380/25 |
| 5,555,244 A | 9/1996 | Gupta et al. | 370/60.1 |

(List continued on next page.)

FOREIGN PATENT DOCUMENTS

WO        99/53408        10/1999

OTHER PUBLICATIONS

"Planning and Deploying a Single Sign–On Solution" 1997, Library.n0i.net, p. 1–45.*
Vaudreuil, "Security Orientations, A Explanation of Single Sign On" Dec. 6, 1997, p. 1–5.*
Bellovin, Steven M., "Problem Areas for the IP Security Protocols", Jul. 22–25, 1996, Proceedings of the Sixth Usenix UNIX Security Symposium, San Jose, CA.

*Primary Examiner*—Gail Hayes
*Assistant Examiner*—Christopher A. Revak
(74) *Attorney, Agent, or Firm*—Thelen Reid & Priest LLP

(57) ABSTRACT

A method for providing single step log-on access for a subscriber to a computer network. The computer network is differentiated into public and private areas. Secure access to the private areas is provided by a Service Selection Gateway (SSG) Server, introduced between a conventional Network Access Server (NAS) and an Authentication Authorization and Accounting (AAA) Server. The SSG Server intercepts and manipulates packets of data exchanged between the NAS and the AAA Server to obtain all the information it needs to automatically log the user on when the user logs on to the NAS. An authorized user is thus spared the task of having to re-enter username and password data or launch a separate application in order to gain secure access to private areas of the network.

37 Claims, 2 Drawing Sheets

U.S. PATENT DOCUMENTS

| | | | |
|---|---|---|---|
| 5,570,361 A | 10/1996 | Norizuki et al. | 370/60.1 |
| 5,655,077 A | 8/1997 | Jones et al. | 395/187.01 |
| 5,668,857 A | 9/1997 | McHale | 379/93.07 |
| 5,671,354 A | 9/1997 | Ito et al. | 395/187.01 |
| 5,673,265 A | 9/1997 | Gupta et al. | 370/432 |
| 5,678,006 A | 10/1997 | Valizadeh et al. | 395/200.02 |
| 5,699,521 A | 12/1997 | Iizuka et al. | 395/200.15 |
| 5,706,427 A * | 1/1998 | Tabuki | 713/201 |
| 5,740,176 A | 4/1998 | Gupta et al. | 370/440 |
| 5,815,665 A | 9/1998 | Teper et al. | 395/200.59 |
| 5,835,725 A | 11/1998 | Chiang et al. | 395/200.58 |
| 5,835,727 A | 11/1998 | Wong et al. | 395/200.68 |
| 5,841,970 A * | 11/1998 | Tabuki | 713/201 |
| 5,845,070 A | 12/1998 | Ikudome | 395/187.01 |
| 5,857,074 A | 1/1999 | Johnson | 395/200.47 |
| 5,898,780 A | 4/1999 | Liu et al. | 380/25 |
| 5,918,016 A | 6/1999 | Brewer et al. | 395/200.5 |
| 5,958,016 A | 9/1999 | Chang et al. | 709/229 |
| 5,974,453 A | 10/1999 | Andersen et al. | 709/220 |
| 5,987,232 A * | 11/1999 | Tabuki | 713/201 |
| 5,991,810 A | 11/1999 | Shapiro et al. | 709/229 |
| 6,011,910 A | 1/2000 | Chau et al. | 395/200.59 |
| 6,021,496 A | 2/2000 | Dutcher et al. | 713/202 |
| 6,047,376 A | 4/2000 | Hosoe | 713/201 |
| 6,092,196 A | 7/2000 | Reiche | 713/200 |
| 6,141,687 A | 10/2000 | Blair | 709/225 |

* cited by examiner

METHOD FOR PROVIDING SINGLE STEP LOG-ON ACCESS TO A DIFFERENTIATED COMPUTER NETWORK

RELATED APPLICATIONS

This application is a continuation of Ser. No. 09/128/990 which was filed on Aug. 3, 1998, which is now U.S. Pat. No. 6,311,275 which is commonly owned herewith.

BACKGROUND OF THE INVENTION

1. Field of the Invention

The present invention relates to a method for providing simplified access to subscribers of a differentiated computer network. Specifically, the present invention relates to a method for allowing single step log-on access to a network having more than one separate access area, such as a network divided into both public and private areas, where access to public areas is provided by a conventional Network Access Server, or NAS, and access to private areas is provided by a separate Service Selection Gateway, or SSG.

2. Background

Every day, millions of people around the world perform the modern ritual of the network "log-on." From the user standpoint, the process is simple: if all goes well, after a click of the mouse, and perhaps a few quick keystrokes, the short melodic overture of computers exchanging bits begins, and the intrepid user soon finds himself speeding down the Information Superhighway. Mercifully, the user is usually spared from having to know anything about the technical details of the log-on procedure, which involves multiple servers working in concert to handle the thousands of subscribers who seek access to the network at any given time. The continued success of computer networking technology depends on keeping access easy. As networks have evolved, however, they have begun to differentiate into areas that provide specialized services to selected users. Because of this trend, security and user-authorization protocols are becoming more complicated, often in ways that conflict with the need for easy accessibility.

In order to gain access to a computer network, such as the World-Wide-Web, or the Internet, or a private Intranet network, a user must first dial-in or otherwise connect to a Network Access Server, or NAS. The NAS serves as a gate between the computer network and the user. As a threshold matter, the NAS must authenticate the identity of the subscriber in order to ascertain the nature and scope of the services that it will provide. Of course, if the network is differentiated into public areas that are accessible to all subscribers generally, and private areas that are accessible only to authorized subscribers, then the user's identity is particularly important.

The authentication-procedure generally involves another server, herein referred to as an Authentication, Authorization, and Accounting Server, or an AAA Server. The NAS is a client of the AAA Server, which may serve several client NAS's simultaneously. The NAS and the AAA Server communicate with one another according to a standard Internet protocol, such as the Remote Authentication Dial-In User Service (RADIUS) protocol, developed by Livingston Enterprises of Pleasanton, Calif. The description of the authentication procedure that follows is based on the RADIUS protocol.

Typically, the user begins his or her session on the network by first launching a dial-in application on his or her PC that prompts the user to enter some form of user identification, like a user-name, and a private password. Such information may also be stored on and automatically provided by the PC. The dial-in application contacts an NAS, for instance, via modem and telephone line, and provides the NAS with the user-entered entered information. The password data is usually encrypted using methods well-known to those of ordinary skill in the art. The NAS then prepares and sends an "access-request" packet to the AAA Server. The access request packet contains the data entered by the user, as well as additional data identifying the particular NAS client from which the packet was sent.

The AAA Server contains a large database of stored information on the accounts of each subscriber, including user-names, encrypted passwords and configuration information detailing the type of service that is to be provided to each user. When the AAA Server receives an access-request packet from an authorized NAS client, it consults its database of users to find the account entry for the user identified by the information contained in the access-request packet. The account entry will often specify certain requirements that must be met in order for the user to gain access to the network, including information on the clients and ports on the network which the user is allowed to access. An important requirement, of course, is that the password entered by the user match the password specified in the account entry on the AAA database. If the passwords match, and all the other requirements are met, then the AAA Server sends the NAS an "access-accept" packet in response. The access-accept packet contains configuration data that enable the NAS to provide the desired service to the user.

If any requirement is not met, then the AAA Server responds with an "access-reject" packet indicating that the user request in invalid. The access-reject packet may also contain text messages which may be delivered to the user by the NAS. Even if all the requirements are met, the AAA Server may still deny immediate access to the user and instead issue an "access-challenge" packet that prompts the user for new information before access is finally granted.

In order for the network to communicate with the user, the user must be assigned an IP address. User IP addresses are usually assigned dynamically, meaning that a user's IP address can change from session to session. The IP address can be assigned either by the AAA Server, or by the NAS. Once an IP address has been assigned to the user, the user is logged-on to the NAS and can begin his or her session on the network. After logging the user on, the NAS sends an "accounting-start" packet to the AAA Server, containing information regarding, for instance, the time at which the user's session begins, or other administrative and accounting data, that can be stored on the AAA Server's database.

A complication in this scheme arises when the network contains private areas whose access is regulated by a third server, herein referred to as a Service Selection Gateway, or SSG Server. The SSG Server is inserted between the NAS and the AAA Server, and its function is to create secure channels to private areas of the network for authorized users only. In order to access these private areas, an authorized user must somehow log-on to the SSG server as well.

Of course, it is possible to simply inflict upon the user the job of performing a second log-on to the SSG Server after the first log-on to the NAS. This approach is rather cumbersome and inelegant, however, and it requires the use of a separate and largely redundant software application on the user's PC, called a "dashboard." In order for an authorized user to access private areas of the network through the SSG Server, he or she must first log on to the network using the primary dial-in application, then launch the dashboard, and then log on a second time with the SSG Server.

This solution leaves much to be desired. The torment that comes from staring at pixellated cartoons of tiny telephones on a computer monitor, occasionally for minutes at a time, as a PC attempts to log-on to a heavily-trafficked network, is already an all-too familiar source of frustration to many subscribers of computer network services. Such delays can be caused, for instance, by the large number of access requests that must be handled by the AAA Server. The second log-on to the SSG requires a second authorization to access data from a private network and therefore simply adds unnecessarily to the traffic seen by the AAA Server. It also requires the user to re-enter his or her username and password.

Unfortunately, it is not enough to simply pass username and password information from the NAS to the SSG Server. Without the user IP address, the SSG Server has no way to send information from the private areas of the network to the user. While it might be possible to reconfigure the NAS to provide the IP address to the SSG Server directly, or demand that IP addresses are assigned by the AAA Server instead of the NAS, a more practical solution would view both the NAS and AAA Server as fixed and inviolate, and would seek instead to adapt the behavior of the SSG Server.

Accordingly, it is an object and advantage of the present invention to provide single step log-on access to a differentiated computer network having more than one. separate access area, such as a network divided into both public and private areas, where access to public areas is provided by a conventional Network Access Server, or NAS, and access to private areas is provided by a separate Service Selection Gateway, or SSG.

Another object and advantage of the present invention is to provide single step log-on access to a differentiated computer network having more than one separate access area, such as a network divided into both public and private areas, where access to public areas is provided by a conventional NAS, and access to private areas is provided by an SSG, without altering the behavior of the NAS.

Another object and advantage of the present invention is to provide single step log-on access to a differentiated computer network having more than one separate access area, such as a network divided into both public and private areas, where access to public areas is provided by a conventional NAS, and access to private areas is provided by an SSG, without altering the behavior of the AAA Server.

Yet another object and advantage of the present invention is to provide single step log-on access to a differentiated computer network having more than one separate access area, such as a network divided into both public and private areas, without the need for a separate dashboard application.

BRIEF DESCRIPTION OF THE INVENTION

The present invention is a method for providing single step log-on access for a subscriber to a differentiated computer network having more than one separate access area. The method involves intercepting packets of data between the NAS and the AAA Server with an SSG Server, and manipulating these packets to obtain information needed by the SSG Server to log the user on automatically, without requiring the user to re-enter username and password data, or launch a separate application. Once the user is logged-on to the SSG Server, the SSG is able to provide the user with secure access to additional areas of the network. From the user's point of view, the log-on procedure with the SSG Server is identical to the log-on procedure without it.

BRIEF DESCRIPTION OF THE FIGURES

FIGS. 2A, 2B, and 2C are drawings illustrating the order in which packets are exchanged in a network of three servers during log-on.

DETAILED DESCRIPTION OF THE INVENTION

Those of ordinary skill in the art will realize that the following description of the present invention is illustrative only and is not intended to be in any way limiting. Other embodiments of the invention will readily suggest themselves to such skilled persons from an examination of the within disclosure.

Figure 1:
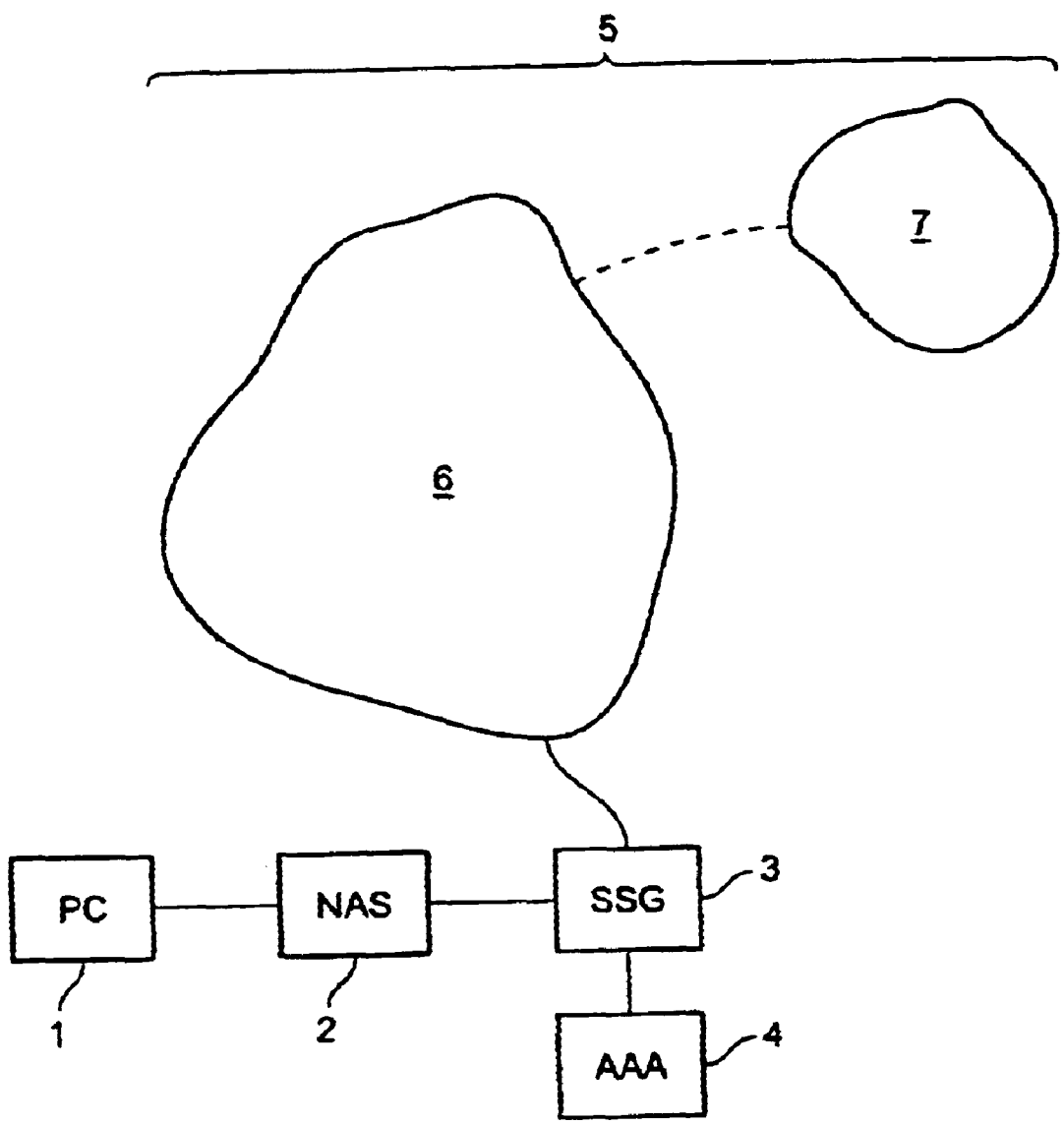
FIG. 1 is a schematic drawing of a network of three servers and a differentiated computer network.
Figure 2A:
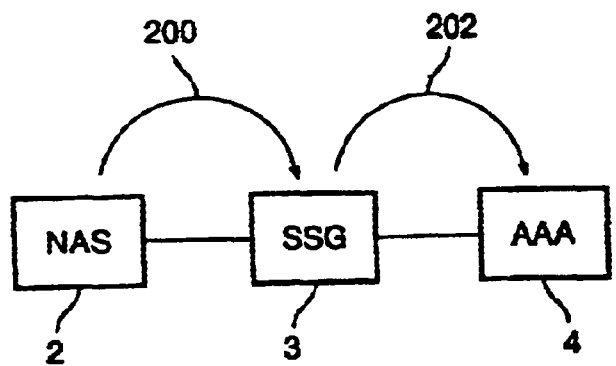
Figure 2B:
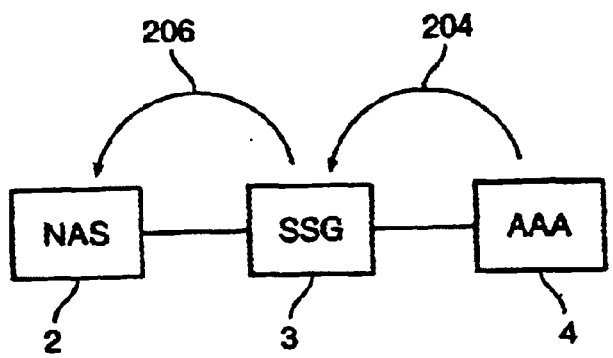
Figure 2C:
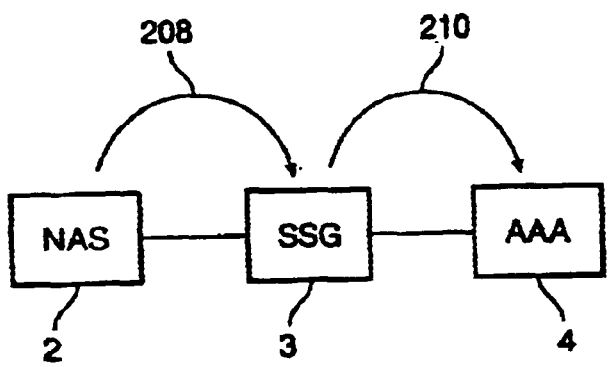

In a presently-preferred embodiment of the invention, illustrated in FIG. 1, a subscriber PC 1 to a computer network 5 having both public and private areas 6, 7 is linked to a Network Access Server, or NAS 2. The NAS 2 is linked to an Authentication, Authorization, and Accounting Server, or AAA Server 4 through a Service Selection Gateway, or SSG 3. The NAS 2, SSG 3, and AAA 4 Servers communicate with one another according to the Remote Access Dial-in User Service protocol, or RADIUS. The details of the RADIUS protocol are well-known to those of ordinary skill in the art. Moreover, as will be apparent to those of ordinary skill in the art, only a few general features of the RADIUS protocol are utilized by the present invention. The methods of present invention described herein are therefore applicable to any other authentication protocol equivalent in relevant part to the RADIUS protocol.

In essence, the need for a second log-on to the SSG Server 3 is obviated by allowing the SSG Server 3 to intercept and forward all packets of data exchanged between the NAS 2 and the AAA Server 4. To the NAS 2, the SSG Server 3 simply acts as a proxy AAA Server 4. The presence of the SSG Server 3 is unfelt by the NAS 2, which continues to behave exactly as if were connected directly to the AAA Server 4. By "eavesdropping" on the communications between the NAS 2 and the AAA Server 4, the SSG Server 3 is able to obtain all the information it needs to log the user on automatically, without requiring the user to re-enter data, or to launch a separate application. The methods of the present invention do not require any alteration in the behavior of the NAS 2, or the AAA Server 4.

As described above, the user initiates a session on the network 5 by launching a dial-up application on his or her subscriber PC 1. The dial-up application prompts the user for user-name and password information, and contacts the NAS 2. The NAS 2 prepares an access-request packet containing the user-specified information, as well as information about the NAS client 2 itself. Instead of being delivered directly to the AAA Server 4, however, the access-request packet is first intercepted by the SSG Server 3, at step 200. Since the access-request packet contains username and password information, receipt of the access-request packet by the SSG Server 3 supplants the need for requiring the user to supply this information to the SSG Server 3 using a separate dashboard application. However,.as described above, the SSG Server 3 still needs the user IP address to complete the log-on procedure. The user IP address, however, has not yet been assigned, and extra steps must be taken before the SSG Server 3 can officially log the user on.

The SSG Server 3 forwards the access-request packet to the AAA Server 4 at step. 202. The AAA Server 4 first authenticates the user by checking the data attributes in the access-request packet against its account database. The AAA Server 4 then responds to the access-request by issuing an access-reply packet back to the SSG Server 3 at step 204. If the user authentication check is successful, then the AAA Server 4 may assign an IP address to the user and include this IP address in the access reply packet. The SSG server 3 then checks for an IP address in the access-reply packet. If the SSG Server 3 finds an IP address, then the SSG Server 3 can log the user on with the IP address provided by the AAA Server 4, and then forward the access-reply packet on to the NAS 2 immediately at step 206. Once the access-reply packet is received by the NAS 2, it may then log the user on as well, and the user session can begin.

If the AAA Server 4 authorizes the user but does not assign an IP address, then the SSG Server 3 can log the user on with a dummy temporary IP address. It then assigns the user an identification number that it inserts into the access-reply packet before forwarding the access-reply packet to the NAS 2 at step 206. The identification number is written as a special attribute in the access-reply packet, called a "class attribute" in the RADIUS protocol. The class attribute is read and stored by the NAS 2 and echoed back unchanged in subsequent packets. The temporary IP address can be used as an identification number.

Upon receipt of the access-reply packet authorizing the user to access the network, the NAS 2 assigns a genuine IP address to the user and logs the user on. At step 208, the NAS 2 then prepares and sends an "accounting-start" packet to the AAA Server 4, containing information like the time at which the user began his or her session, as well as the genuine IP address assigned to the user by the NAS 2. The accounting-start packet serves an administrative function and would be prepared and sent by the NAS 2 even without the presence of an SSG Server 3. The accounting start packet is intercepted by the SSG Server 3 on its way to the AAA Server 4, and will contain not only an IP address, but also the class attribute identifying the user to whom the IP address belongs. With these two pieces of information, the SSG Server 3 can replace the dummy IP address with the genuine IP address for the user, and log the user on officially. Finally, the SSG Server 3 forwards the accounting start packet to the AAA Server 4 at step 210.

In short, the user can now log on to both the NAS 2 and the SSG Server 3, without having to launch a second application, or perform a separate log-on to the SSG Server 3. From the vantage point of the user, the log-on procedure does not change in any way with the addition of the SSG Server 3. Because of the presence of the SSG Server 3, however, an authorized user is now able to gain secure access to, for example, private areas of the network, with the same ease that he or she is able to access the public areas.

Alternative Embodiments

Although illustrative presently preferred embodiments and applications of this invention are shown and described herein, many variations and modifications are possible which remain within the concept, scope, and spirit of the invention, and these variations would become clear to those of skill in the art after perusal of this application. For example, the invention can be used with any type of connection between a user and an NAS and need not be limited to dial-up telephone connections. The invention, therefore, is not intended to be limited except in the spirit of the appended claims.

What is claimed is:

1. A method for providing single step log-on access to a subscriber of a computer network having first and second area, said method including the steps of:

linking a Service Selection Gateway (SSG) Server to a Network Access Server (NAS), said NAS providing said subscriber with access to said first area, and said SSG Server providing said subscriber with access to said second area;

linking said SSG Server to an Authentication Authorization and Accounting (AAA) Server;

intercepting and forwarding with the SSG Server packets of data sent between said NAS and the AAA Server so that the packets of data sent to the AAA Server by the NAS are intercepted and forwarded by the SSG Server and packets of data sent by the AAA Server to the NAS are intercepted and forwarded by the SSG Server; and manipulating information in the packets of data to allow the SSG Server to automatically log the subscriber on the SSG Server when the subscriber logs on to the NAS, without requiring the subscriber to re-enter data already entered or launch a separate application.

2. A method for providing a subscriber with single step log-on access to a computer network having a first area and a second area, said method comprising:

intercepting at a service selection gateway (SSG) server, from a Network Access Server (NAS), a log-on request packet initiated by a user seeking to gain access to the first area, access to which is controlled by the NAS, and to the second area access to which is controlled by the SSG server;

sending, from the SSG server to an Authentication Authorization and Accounting (AAA), server, an authorization request packet derived from the intercepted log-on request packet;

receiving at the SSG server, from the AAA server, an authorization packet responsive to the authorization request packet; and processing, at the SSG server, the log-on request packet and the authorization packet for enabling the SSG server to automatically log the subscriber on to the SSG server for access to the second area when the subscriber logs on to the NAS.

3. A method for providing a subscriber with single step log-on access to a computer network having a first area and a second area, said method comprising:

intercepting a log-on request initiated by the subscriber at a Service Selection Gateway (SSG);

routing the log-on request from the SSG to an Authentication, Authorization and Accounting (AAA) server to initiate log-on for the subscriber to the first area;

receiving and processing an access-reply received from the AAA server at the SSG and based thereon providing log-on access for the subscriber to the second area; and routing the access-reply received from the AAA server responsive to the log-on request to a Network Access Server (NAS) to complete log-on for the subscriber to the first area.

4. A method for providing a subscriber with single step log-on access to a computer network having a first area and a second area, said method comprising:

intercepting, at a Service Selection Gateway (SSG), a log-on request received from a network access server (NAS) and initiated by the subscriber;

utilizing at the SSG information contained in the log-on request to initiate log-on for the subscriber to the second area;

routing the log-on request from the SSG to an Authentication, Authorization and Accounting (AAA) server to initiate log-on for the subscriber to the first area;

receiving and processing an access-reply received from the AAA server at the SSG and, based thereon, providing log-on access for the subscriber to the second area; and routing an access-reply received from the AAA server at the SSG to the NAS to complete log-on for the subscriber to the first area.

5. A method for providing a subscriber with single step log-on to a computer network differentiated into a plurality of areas, said method comprising:

receiving from a Network Access Server (NAS) at a Service Selection Gateway (SSG) an access-request;

forwarding the access-request from the SSG to an Authentication, Authorization and Accounting (AAA) server;

receiving a responsive access-reply at the SSG from the AAA server;

checking the access-reply at the SSG to determine if it contains an Internet Protocol (IP) address assigned by the AAA server to the subscriber;

if the access-reply contains an assigned IP address, then:
  logging the subscriber on to the SSG with the assigned IP address if the access-reply contains authorization to do so from the AAA server;
  forwarding the access-reply to the NAS so that the subscriber may log-on to the NAS with the assigned IP address if the access-reply contains authorization to do so from the AAA server;

if the access-reply does not contain an assigned IP address, then:
  logging the subscriber on to the SSG with a temporary IP address if the access-reply contains authorization to do so from the AAA server;
  assigning a user identification to the subscriber at the SSG;
  forwarding the access-reply and the user identification to the NAS so that subscriber may log-on to the NAS with a NAS-assigned IP address if the access-reply contains authorization to do so from the AAA server;
  receiving from the NAS at the SSG an accounting-start request identifying the NAS-assigned IP address and the user identification;
  replacing the temporary IP address with the NAS-assigned IP address at the SSG; and
  forwarding the accounting-start request from the SSG to the AAA server.

6. A method for providing a subscriber with single step log-on to a computer network differentiated into a plurality of areas, said method comprising:

receiving from a network access server (NAS) at a service selection gateway (SSG) an access-request packet in accordance with a communications protocol;

forwarding the access-request packet from the SSG to an Authentication, Authorization and Accounting (AAA) server;

receiving a responsive access-reply packet in accordance with the communications protocol at the SSG from the AAA server;

checking the access-reply packet at the SSG to determine if it contains an Internet Protocol (IP) address assigned to the subscriber by the AAA server;

if the access-reply packet contains an assigned IP address, then:
  logging the subscriber on to the SSG with the assigned IP address if the access-reply packet contains authorization to do so from the AAA server;
  forwarding the access-reply packet to the NAS;

if the access-reply packet does not contain an assigned IP address, then:
  logging the subscriber on to the SSG with a temporary IP address if the access-reply packet contains authorization to do so from the AAA server;
  assigning a user identification to the subscriber at the SSG;
  forwarding the access-reply packet and the user identification to the NAS;

if the access-reply packet does not contain an assigned IP address, then:
  logging the subscriber onto the SSG with a temporary IP address if the access-reply packet contains authorization to do so from the AAA server;
  assigning a user identification to the subscriber at the SSG;
  forwarding the access-reply packet and the user identification to the NAS;
  receiving from the NAS at the SSG an accounting-start request packet in accordance with the communications protocol, the accounting-start request packet identifying a NAS-assigned IP address and the user identification;
  replacing the temporary IP address with the NAS-assigned IP address at the SSG; and
  forwarding the accounting-start request packet from the SSG to the AAA server.

7. A method in accordance with claim 6, wherein the communications protocol includes the Remote Authentication Dial-In User Service (RADIUS) protocol.

8. A method in accordance with claim 7, further comprising writing the user identification into the access-reply packet as a RADIUS attribute.

9. A method in accordance with claim 8, wherein the RADIUS attribute is a RADIUS class attribute.

10. A method in accordance with claim 6, wherein the user identification is the temporary IP address.

11. An apparatus for providing a subscriber with single step log-on access to a computer network having a first area and a second area, said apparatus comprising:

means for intercepting at a service selection gateway (SSG) server, from a Network Access Server (NAS), a log-on request packet initiated by a user seeking to gain access to the first area, access to which is controlled by the NAS, and to the second area, access to which is controlled by the SSG server;

means for sending, from the SSG server to an Authentication Authorization and Accounting (AAA) server, an authorization request packet derived from the intercepted log-on request packet;

means for receiving at the SSG server, from the AAA server, an authorization packet responsive to the authorization request packet; and means for processing, at the SSG server, the log-on request packet and the authorization packet for enabling the SSG server to automatically log the subscriber on to the SSG server for access to the second area when the subscriber logs on to the NAS.

12. An apparatus for providing a subscriber with single step log-on access to a computer network having a first area and a second area, said apparatus comprising:

means for intercepting a log-on request initiated by the subscriber at a Service Selection Gateway (SSG);

means for routing the log-on request from the SSG to an Authentication, Authorization and Accounting (AAA) server to initiate log-on for the subscriber to the first area;

means for receiving and processing an access-reply received from the AAA server at the SSG and, based thereon, providing log-on access for the subscriber to the second area; and means for routing the access-reply received from the AAA server responsive to the log-on request to a Network Access Server (NAS) to complete log-on for the subscriber to the first area.

13. An apparatus for providing a subscriber with single step log-on access to a computer network having a first area and a second area, said method comprising:

means for intercepting, at a Service Selection Gateway (SSG), a log-on request received from a network access server (NAS) and initiated by the subscriber;

means for utilizing at the SSG information contained in the log-on request to initiate log-on for the subscriber to the second area;

routing the log-on request from the SSG to an Authentication, Authorization and Accounting (AAA) server to initiate log-on for the subscriber to the first area;

means for receiving and processing an access-reply received from the AAA Server at the SSG and, based thereon, providing log-on access for the subscriber to the second area; and means for routing an access-reply received from the AAA server at the SSG to the NAS to complete log-on for the subscriber to the first area.

14. An apparatus for providing a subscriber with single step log-on to a computer network differentiated into a plurality of areas, said apparatus comprising:

means for receiving from a Network Access Server (NAS) at a Service Selection Gateway (SSG) an access-request;

means for forwarding the access-request from the SSG to an Authentication, Authorization and Accounting (AAA) server;

means for receiving a responsive access-reply at the SSG from the AAA server;

means for checking the access-reply at the SSG to determine if it contains an Internet Protocol (IP) address assigned by the AAA server to the subscriber;

if the access-reply contains an assigned IP address, then:
  means for logging the subscriber on to the SSG with the assigned IP address if the access-reply contains authorization to do so from the AAA server;
  means for forwarding the access-reply to the NAS so that the subscriber may log-on to the NAS with the assigned IP address if the access-reply contains authorization to do so from the AAA server;

if the access-reply does not contain an assigned IP address, then:
  means for logging the subscriber on to the SSG with a temporary IP address if the access-reply contains authorization to do so from the AAA server;
  means for assigning a user identification to the subscriber at the SSG;
  means for forwarding the access-reply and the user identification to the NAS so that subscriber may log-on to the NAS with a NAS-assigned IP address if the access-reply contains authorization to do so from the AAA server;
  means for receiving from the NAS at the SSG an accounting-start request identifying a NAS-assigned IP address and the user identification;
  means for replacing the temporary IP address with the NAS-assigned IP address at the SSG; and
  means for forwarding the accounting-start request from the SSG to the AAA server.

15. An apparatus for providing a subscriber with single step log-on to a computer network differentiated into a plurality of areas, said apparatus comprising:

means for receiving from a network access server (NAS) at a service selection gateway (SSG) an access-request packet in accordance with a communications protocol;

means for forwarding the access-request packet from the SSG to an Authentication, Authorization and Accounting (AAA) server;

means for receiving a responsive access-reply packet in accordance with the communications protocol at the SSG from the AAA server;

means for checking the access-reply packet at the SSG to determine if it contains an Internet Protocol (IP) address assigned to the subscriber by the AAA server;

if the access-reply packet contains an assigned IP address, then:
  means for logging the subscriber on to the SSG with the assigned IP address if the access-reply packet contains authorization to do so from the AAA server;
  means for forwarding the access-reply packet to the NAS;

if the access-reply packet does not contain an assigned IP address, then:
  means for logging the subscriber on to the SSG with a temporary IP address if the access-reply packet contains authorization to do so from the AAA server;
  means for assigning a user identification to the subscriber at the SSG;
  means for forwarding the access-reply packet and the user identification to the NAS;

if the access-reply packet does not contain an assigned IP address, then:
  means for logging the subscriber onto the SSG with a temporary IP address if the access-reply packet contains authorization to do so from the AAA server;
  means for assigning a user identification to the subscriber at the SSG;
  means for forwarding the access-reply packet and the user identification to the NAS;
  means for receiving from the NAS at the SSG an accounting-start request packet in accordance with the communications protocol, the accounting-start request packet identifying a NAS-assigned IP address and the user identification;
  means for replacing the temporary IP address with the NAS-assigned IP address at the SSG; and
  means for forwarding the accounting-start request packet from the SSG to the AAA server.

16. An apparatus in accordance with claim 15 wherein the communications protocol includes the Remote Authentication Dial-In User Service (RADIUS) protocol.

17. An apparatus in accordance with claim 16 further comprising writing the user identification into the access-reply packet as a RADIUS attribute.

18. An apparatus in accordance with claim 17 wherein the RADIUS attribute is a RADIUS class attribute.

19. An apparatus in accordance with claim 15 wherein the user identification is the temporary IP address.

20. An apparatus for providing a single step log-on access for a subscriber of a computer network having a first area and a second area, said computer network including at least one Network Access Server (NAS) and at least one Authentication Authorization and Accounting (AAA) Server, said NAS providing access for the subscriber to said first area, said apparatus comprising:

a Service Selection Gateway (SSG) Server providing access for the subscriber to the second area, said SSG Server connected between the NAS and the AAA Server, said SSG Server: (1) receiving an access-request packet from the NAS when the subscriber connects the NAS, (2) forwarding said access-request packet to the AAA Server, (3) receiving an access-reply packet from the AAA Server in response to said access-request packet, and (4) forwarding said access-reply packet to the NAS; and processing information in said access-reply packet for enabling said SSG Server to automatically log the subscriber onto said SSG Server when the subscriber logs onto the NAS.

21. A system for providing a single step log-on access for a subscriber of a computer network having a first area and a second area, said system comprising:

a Network Access Server (NAS) for providing access for the subscriber to the first area, said NAS sending an access-request packet when the subscriber connects to said NAS according to a communications protocol;

an Authentication Authorization and Accounting (AAA) Server for receiving said access-request packet and sending an access-reply packet in response; and a Service Selection Gateway (SSG) Server for providing access for the subscriber to the second area, said SSG Server connected between said NAS and said AAA Server, said SSG Server receiving said access-request packet from said NAS, forwarding said access-request packet to said AAA Server, receiving said access-reply packet in from said AAA Server, and forwarding said access-reply packet to said NAS.

22. A programmable storage device readable by a machine tangibly embodying a program of instructions executable by the machine to perform method steps for providing single step log-on access to a subscriber of a computer network having a first area and a second area, said method comprising:

linking a Service Selection Gateway (SSG) to a Network Access Server (NAS), the NAS providing the subscriber with access to the first area, and said SSG providing the subscriber with access to the second area, wherein the subscriber supplies data packets to log-on to the NAS in order to obtain access to the first area;

linking the SSG to an Authentication Authorization and Accounting (AAA) Server;

intercepting and forwarding with the SSG the data packets sent between the NAS and the AAA server with the SSG; and processing information in the data packets with the SSG for enabling the SSG to automatically log the subscriber on to the SSG when the subscriber logs on to the NAS.

23. A programmable storage device readable by a machine tangibly embodying a program of instructions executable by the machine to perform method steps for providing single step log-on access for a subscriber of a computer network having a first area and a second separate area, said method comprising:

receiving access-request packets from a Network Access Server (NAS) at a Service Selection Gateway (SSG);

utilizing at the SSG information in said access-request packets to initiate log-on for said subscriber to the second area;

routing said access-request packets from said SSG to an Authentication Authorization and Accounting (AAA) Server to initiate log-on for the subscriber to the first area; and routing access-reply packets responsive to said access-request packets received at said SSG from said AAA Server to said NAS to complete log-on for the subscriber to the first area.

24. A programmable storage device readable by a machine tangibly embodying a program of instructions executable by the machine to perform method steps for providing single step log-on access to a subscriber of a computer network, said computer network differentiated into a plurality of areas, said method comprising:

receiving an access-request packet from a Network Access Server (NAS) at a Service Selection Gateway (SSG) when the subscriber connects to the NAS, in accordance with a communications protocol;

forwarding said access-request packet to an Authentication Authorization and Accounting (AAA) Server;

receiving an access-reply packet from the AAA Server at the SSG in accordance with the protocol;

determining if said access-reply packet contains an Internet Protocol (IP) address for the subscriber, the IP address assigned by the AAA Server;

if the access-reply packet contains an AAA-assigned IP address, then:
  logging the subscriber on to the SSG Server with said AAA-signed IP address, if said access-reply packet contains authorization from said AAA Server;
  forwarding the access-reply packet to the NAS; and
  logging the subscriber on to the NAS with the AAA-assigned IP address, if the access-reply packet contains authorization from the AAA Server; or if the access-reply packet does to contain an AAA-assigned IP address, then:
  logging the subscriber on to the SSG server with a temporary IP address, if said access-reply packet contains authorization from the AAA Server;
  assigning a user identification to the subscriber;
  forwarding the access-reply packet and the user identification to the NAS;
  logging the subscriber on to the NAS with a NAS-assigned IP address, if the access-reply packet contains authorization from the AAA Server;
  receiving an accounting-start packet from said NAS at the SSG said accounting-start packet containing a NAS-assigned IP address and the user identification;
  reading accounting-start packet to determine the NAS-assigned IP address of the subscriber;
  replacing the temporary IP address with the NAS-assigned IP address on the SSG; and
  forwarding the accounting-start packet to the AAA Server.

25. The programmable storage device of claim 24, wherein the communications protocol is a Remote Authentication Dial-In User Service (RADIUS) protocol.

26. The programmable storage device of claim 25, wherein said first forwarding step further comprises:
  writing the user identification into the access-reply packet as a RADIUS Attribute.

27. The programmable storage device of claim 26, wherein said RADIUS Attribute is written as a RADIUS Class Attribute.

28. The programmable storage device of claim 24, wherein said user identification number is the temporary IP address.

29. A program storage device readable by a machine, tangibly embodying a program of instructions executable by the machine to perform a method for providing a subscriber with single step log-on access to a computer network having a first area and a second area, the method comprising:

intercepting at a service selection gateway (SSG) server, from a Network Access Server (NAS), a log-on request packet initiated by a user seeking to gain access to the first area and to the second area;

sending, from the SSG server to an Authentication Authorization and Accounting (AAA), server, an authorization request packet derived from the received log-on request packet;

receiving, from the AAA server, an authorization packet responsive to the authorization request packet; and processing, at the SSG server, the log-on request packet and the authorization packet for enabling the SSG server to automatically log the subscriber onto the SSG server for access to the second area when the subscriber logs onto the NAS.

30. A program storage device readable by a machine, tangibly embodying a program of instructions executable by the machine to perform a method for providing a subscriber with single step log-on access to a computer network having a first area and a second area, the method comprising:

intercepting a log-on request initiated by the subscriber at a Service Selection Gateway (SSG);

routing the log-on request from the SSG to an Authentication, Authorization and Accounting (AAA) server to initiate log-on for the subscriber to the first area;

receiving and processing an access-reply received from the AAA Server at the SSG and, based thereon, providing log-on access for the subscriber to the second area; and routing the access-reply received from the AAA server responsive to the log-on request to a Network Access Server (NAS) to complete log-on for the subscriber to the first area.

31. A program storage device readable by a machine, tangibly embodying a program of instructions executable by the machine to perform a method for providing a subscriber with single step log-on access to a computer network having a first area and a second area, the method comprising:

intercepting, at a Service Selection Gateway (SSG), a log-on request received from a network access server (NAS) and initiated by the subscriber;

utilizing at the SSG information contained in the log-on request to initiate log-on for the subscriber to the second area;

routing the log-on request from the SSG to an Authentication, Authorization and Accounting (AAA) server to initiate log-on for the subscriber to the first area;

receiving and processing an access-reply received from the AAA Server at the SSG and, based thereon, providing log-on access for the subscriber to the second area; and routing an access-reply received from the AAA server at the SSG to the NAS to complete log-on for the subscriber to the first area.

32. A program storage device readable by a machine, tangibly embodying a program of instructions executable by the machine to perform a method for providing a subscriber with single step log-on to a computer network differentiated into a plurality of areas, the method comprising:

receiving from a Network Access Server (NAS) at a Service Selection Gateway (SSG) an access-request;

forwarding the access-request from the SSG to an Authentication, Authorization and Accounting (AAA) server;

receiving a responsive access-reply at the SSG from the AAA server;

checking the access-reply at the SSG to determine if it contains an Internet Protocol (IP) address assigned by the AAA server to the subscriber;

if the access-reply contains an assigned IP address, then:

logging the subscriber on to the SSG with the assigned IP address if the access-reply contains authorization to do so from the AAA server;

forwarding the access-reply to the NAS so that the subscriber may log-on to the NAS with the assigned IP address if the access-reply contains authorization to do so from the AAA server;

if the access-reply does not contain an assigned IP address, then:

logging the subscriber on to the SSG with a temporary IP address if the access-reply contains authorization to do so from the AAA server;

assigning a user identification to the subscriber at the SSG;

forwarding the access-reply and the user identification to the NAS so that subscriber may log-on to the NAS with a NAS-assigned IP address if the access-reply contains authorization to do so from the AAA server;

receiving from the NAS at the SSG an accounting-start request identifying a NAS-assigned IP address and the user identification;

replacing the temporary IP address with the NAS-assigned IP address at the SSG; and forwarding the accounting-start request from the SSG to the AAA server.

33. A program storage device readable by a machine, tangibly embodying a program of instructions executable by the machine to perform a method for providing a subscriber with single step log-on to a computer network differentiated into a plurality of areas, the method comprising:

receiving from a network access server (NAS) at a service selection gateway (SSG) an access-request packet in accordance with a communications protocol;

forwarding the access-request packet from the SSG to an Authentication, Authorization and Accounting (AAA) server;

receiving a responsive access-reply packet in accordance with the communications protocol at the SSG from the AAA server;

checking the access-replay packet at the SSG to determine if it contains an Internet Protocol (IP) address assigned to the subscriber by the AAA server;

if the access-reply packet contains an assigned IP address, then:

logging the subscriber on to the SSG with the assigned IP address if the access-reply packet contains authorization to do so from the AAA server;

forwarding the access-reply packet to the NAS;

if the access-reply packet does not contain an assigned IP address, then:

logging the subscriber on to the SSG with a temporary IP address if the access-reply packet contains authorization to do so from the AAA server;

assigning a user identification to the subscriber at the SSG;

forwarding the access-reply packet and the user identification to the NAS;

if the access-reply packet does not contain an assigned IP address, then:

logging the subscriber on to the SSG with a temporary IP address if the access-reply packet contains authorization to do so from the AAA server;

assigning a user identification to the subscriber at the SSG;

forwarding the access-reply packet and the user identification to the NAS;

receiving from the NAS at the SSG an accounting-start request packet in accordance with the communications protocol, the accounting-start request packet identifying the NAS-assigned IP address and the user identification;

replacing the temporary IP address with the NAS-assigned IP address at the SSG; and forwarding the accounting-start request packet from the SSG to the AAA server.

34. A program storage device readable by a machine, tangibly embodying a program of instructions executable by the machine to perform a method for providing in accordance with claim 39, wherein the communications protocol includes the Remote Authentication Dial-In User Service (RADIUS) protocol.

35. A program storage device readable by a machine, tangibly embodying a program of instructions executable by the machine to perform a method for providing in accordance with claim 34, further comprising writing the user identification into the access-reply packet as a RADIUS attribute.

36. A program storage device readable by a machine, tangibly embodying a program of instructions executable by the machine to perform a method for providing in accordance with claim 35, wherein the RADIUS attribute is a RADIUS class attribute.

37. A program storage device readable by a machine, tangibly embodying a program of instructions executable by the machine to perform a method for providing in accordance with claim 33, wherein the user identification is the temporary IP address.

* * * * *

UNITED STATES PATENT AND TRADEMARK OFFICE
CERTIFICATE OF CORRECTION

PATENT NO. : 6,643,782 B1
DATED : November 4, 2003
INVENTOR(S) : Jane Jiaying Jin et al.

It is certified that error appears in the above-identified patent and that said Letters Patent is hereby corrected as shown below:

Column 1,
Line 6, replace "09/128/990" with -- 09/128,990 --.

Column 2,
Line 5, delete the second "entered".

Column 3,
Line 28, after "one" delete ".".

Column 5,
Line 7, replace "access reply" with -- access-reply --.
Line 67, after "having" insert -- a --.

Signed and Sealed this

Twentieth Day of January, 2004

JON W. DUDAS
*Acting Director of the United States Patent and Trademark Office*